(12) United States Patent
Nakata et al.

(10) Patent No.: US 8,146,953 B2
(45) Date of Patent: Apr. 3, 2012

(54) PIPE JOINT COVER STRUCTURE AND PIPE CONNECTION METHOD

(75) Inventors: Haruo Nakata, Sakai (JP); Hironori Iwanaga, Sakai (JP)

(73) Assignee: Daikin Industries, Ltd, Osaka (JP)

( * ) Notice: Subject to any disclaimer, the term of this patent is extended or adjusted under 35 U.S.C. 154(b) by 994 days.

(21) Appl. No.: 12/084,971

(22) PCT Filed: Nov. 17, 2006

(86) PCT No.: PCT/JP2006/322935
§ 371 (c)(1),
(2), (4) Date: May 14, 2008

(87) PCT Pub. No.: WO2007/058290
PCT Pub. Date: May 24, 2007

(65) Prior Publication Data
US 2009/0167015 A1   Jul. 2, 2009

(30) Foreign Application Priority Data

Nov. 17, 2005  (JP) .................................. 2005-333302
Jan. 31, 2006  (JP) .................................. 2006-023472

(51) Int. Cl.
*F16L 33/00* (2006.01)
(52) U.S. Cl. ............... 285/249; 285/3; 285/45; 285/901; 138/89
(58) Field of Classification Search .................. 285/901, 285/45, 12, 3, 249; 138/89, 94, 96 R
See application file for complete search history.

(56) References Cited

U.S. PATENT DOCUMENTS

| | | | | |
|---|---|---|---|---|
| 2,416,829 A * | 3/1947 | Hartley | ........................... | 138/89 |
| 2,625,955 A * | 1/1953 | Day | ............................... | 138/89 |
| 2,933,333 A * | 4/1960 | Bredtschneider et al. | ...... | 138/89 |
| 3,036,601 A * | 5/1962 | Fabian, Jr. et al. | ............. | 138/89 |
| 3,070,128 A * | 12/1962 | Collins et al. | .................. | 138/89 |
| 3,425,452 A * | 2/1969 | Shaw | ............................... | 138/89 |
| 3,814,135 A * | 6/1974 | Hetzer et al. | .................... | 138/89 |
| 3,951,172 A * | 4/1976 | Flegel | ............................ | 138/89 |
| 4,290,276 A * | 9/1981 | Knowles | ............................ | 285/3 |
| 4,342,337 A * | 8/1982 | Underwood | ................. | 138/96 T |
| 4,506,705 A * | 3/1985 | Thompson | ..................... | 138/89 |
| 4,915,136 A * | 4/1990 | Bartholomew | ................ | 138/89 |
| 5,848,616 A * | 12/1998 | Vogel et al. | ..................... | 138/89 |
| 6,050,613 A * | 4/2000 | Wartluft | ......................... | 138/89 |
| 6,688,336 B2 * | 2/2004 | Trichard | ......................... | 138/89 |
| 7,597,117 B1 * | 10/2009 | Groso et al. | .................... | 138/89 |
| 7,695,022 B2 * | 4/2010 | Wells | .............................. | 138/94 |

FOREIGN PATENT DOCUMENTS

| | | |
|---|---|---|
| CN | 2264832 | 10/1997 |
| JP | 53-69015 | 6/1978 |
| JP | 54-149728 U | 10/1979 |
| JP | 62-91091 U | 6/1987 |
| JP | 64-74384 A | 3/1989 |
| JP | 11-23105 A | 1/1999 |
| JP | 2003-74768 A | 3/2003 |

* cited by examiner

*Primary Examiner* — David E Bochna
(74) *Attorney, Agent, or Firm* — Birch, Stewart, Kolasch & Birch, LLP.

(57) ABSTRACT

To mount a partition cover (2) in a pipe joint (1), a nut (12) is screwed onto a joint body (11) to sandwich the partition cover (2) between the joint body and the nut. At this time, the partition cover is supported so as not to press a sleeve (13). As such, an opening (1a) of the pipe joint is sealed while preventing the sleeve from being deformed due to the partition cover being mounted.

17 Claims, 9 Drawing Sheets

PIPE JOINT COVER STRUCTURE AND PIPE CONNECTION METHOD

TECHNICAL FIELD

The present invention relates to a pipe joint cover structure in which with no pipe connected to a pipe joint, a partition cover constructed to be removable from the pipe joint seals the opening of the pipe joint. The present invention also relates to the partition cover used in the cover structure, a refrigerator using the cover structure, and a pipe connection method.

BACKGROUND ART

Conventionally, various types of pipe joints have been used for connection of pipes, such as refrigerator coolant pipes, through which a fluid flows. Examples of typical pipe joints include a flare joint and a flareless joint (e.g., see Patent Document 1). As shown in FIG. 12(a), the flare joint includes a joint body 101 and a nut 102 screwed onto the joint body 101. A pipe 103 is connected to the joint body 101 such that its flared end portion 103a is disposed between a conical face 101a provided on the joint body 101 and a conical face 102a provided on the nut 102. Then, the nut 102 is screwed onto the joint body 101 to sandwich the end portion 103a between each of the conical faces 101a and 102a, thereby connecting between the pipe 103 and the joint body 101.

On the other hand, as shown in FIG. 13(a), the flareless joint includes a joint body 111, a nut 112 screwed onto the joint body 111, and a sleeve 113 interposed between the joint body 111 and the nut 112. A pipe 114 is connected to the joint body 111 such that its distal end portion 114a is inserted into a joint hole 111a formed on the inner periphery of the joint body 111. Then, the nut 112 is screwed onto the joint body 111 allowing the sleeve 113 to be deformed by a conical guide face 111b provided on the inner periphery of the joint body 111. A front end portion 113a thus bites into an outer periphery 114b of the pipe 114, thereby connecting between the pipe 114 and the joint body.

For example, those refrigerators that include such pipe joints may undergo a pressure-proof test before piping connection or require the prevention of dust particles or moisture intrusion before piping connection, e.g., during transportation. For this reason, the openings of those pipe joints need to be kept sealed. To this end, with no pipe connected to a pipe joint, such a cover structure is configured that allows the opening of the pipe joint to be sealed with a partition cover constructed to be removable from the pipe joint. For example, in a flare joint cover structure shown in FIG. 12(b), a partition cover 105 may be made of pressed parts such as a copper plate, so that the partition cover 105 is interposed between the conical face 101a of the joint body 101 and the conical face 102a of the nut 102, both of which are formed to sandwich the pipe 103 therebetween. Then, the nut 102 is tightened securely to sandwich the partition cover 105 between the conical faces 101a and 102a, thereby ensuring air tightness at a contact face 105a between the conical face 101a and the partition cover 105. The opening of the pipe joint is thus sealed.

Patent Document 1: Japanese Laid-Open Patent Publication No. 2003-74768

DISCLOSURE OF THE INVENTION

Problems to be Solved by the Invention

When the aforementioned pipe joint cover structure for the flare joint is applied to the flareless joint, the following problems may be raised. FIG. 13(b) shows the arrangement of the flareless joint where a partition cover 115 is arranged between the joint body 111 and the sleeve 113. With the partition cover 115 installed in this manner, the nut 112 may be tightened securely, thereby ensuring air tightness at a contact face 115a between the guide face 111b and the partition cover 115. In this case, the partition cover 115 presses the sleeve 113, possibly causing the sleeve 113 to deform. With the sleeve 113 deformed in this manner, removal of the partition cover 115 for connection of a pipe may possibly raise a problem that the deformed sleeve 113 is not available for use or use of the deformed sleeve 113 leads to a decrease in air tightness after piping connection.

The invention was developed in view of these problems. It is therefore an objective of the present invention to provide a pipe joint cover structure which ensures sealing of the opening of a pipe joint or a flareless joint and prevent a sleeve from being deformed when a partition cover is mounted on the pipe joint which is a flareless joint. It is also an objective of the invention to provide the partition cover used in the cover structure, a refrigerator or the like using the cover structure, and a pipe connection method.

Means for Solving the Problems

A pipe joint cover structure according to the present invention is configured so that with no pipe connected to a pipe joint, a partition cover constructed to be removable from the pipe joint seals the opening of the pipe joint. The pipe joint includes a joint body through which a joint hole to be connected with a pipe is formed, a fastener member to be fastened to the joint body, and a sleeve that is caused to bite into an outer periphery of the pipe by the fastener member being fastened to the joint body with the pipe having been inserted into the joint hole. The fastener member being fastened to the joint body allows the partition cover to be sandwiched between the joint body and the fastener member, and mounted on the pipe joint without affecting the portion of the sleeve biting into the pipe.

According to this arrangement, the partition cover for sealing the opening of the pipe joint which is a flareless joint is sandwiched between the joint body and the fastener member by the fastener member being fastened to the joint body, thereby ensuring sealing of the opening of the pipe joint. Furthermore, the partition cover is mounted on the pipe joint without affecting the portion of the sleeve biting into the pipe, thereby ensuring air tightness during a pipe connection when the pipe joint is used for connection of a pipe. This allows for avoiding such a situation in which when the partition cover is removed for connection of a pipe, the sleeve cannot be used because of its deformation or air tightness is degraded after piping connection because of the sleeve having been deformed. Not to affect the portion of the sleeve biting into in the pipe, the partition cover may be configured not to contact the biting portion of the sleeve during mounting of the partition cover.

Furthermore, the partition cover may also be mounted on the pipe joint so as not to press the sleeve. According to this arrangement, since the partition cover is mounted on the pipe joint so as not to press the sleeve, it is possible to prevent the sleeve from being deformed due to the mounting of the partition cover. As a result, air tightness is reliably prevented from being degraded after piping connection.

Furthermore, the partition cover may also be mounted on the pipe joint so as to elastically press the sleeve. According to this arrangement, since the partition cover is mounted on the pipe joint so as to elastically press the sleeve, the sleeve is prevented from being deformed as much as possible due to the mounting of the partition cover.

Furthermore, the joint body may have a thread portion formed so that the fastener member is screwed onto the thread portion to be thereby fastened to the joint body. According to this arrangement, since the fastener member is fastened to the joint body by being screwed onto the thread portion formed on the joint body, it is possible to ensure that the partition cover is held on the joint body by the fastener member being screwed. This allows for reliably sealing the opening of the pipe joint.

Furthermore, the joint body of the pipe joint may also have a conical guide face formed to guide the sleeve so that the sleeve is deformed to bite into the outer periphery of the pipe upon connection of the pipe. When mounted on the pipe joint, the partition cover may also be brought into contact with the guide face to seal the opening of the pipe joint.

According to this arrangement, the joint body of the pipe joint has a conical guide face formed to guide the sleeve so that the sleeve is deformed to bite into the outer periphery of the pipe upon connection of the pipe. Furthermore, when the partition cover is mounted on the pipe joint, the contact face to the guide face maintains air tightness to thereby seal the opening of the pipe joint. Accordingly, when the partition cover is mounted on the pipe joint, the wedge effect provided by the conical guide face and the partition cover can enhance the tightness between the contact faces. It is thus possible to provide increased air tightness between the contact faces and thereby ensure further improved sealing of the opening of the pipe joint.

Furthermore, when mounted onto the pipe joint, the partition cover may also be brought into contact with an end face of the joint body to which the fastener member is fastened, thereby sealing the opening of the pipe joint.

According to this arrangement, when mounted on the pipe joint, the partition cover is brought into contact with the end face of the joint body on the side on which the fastener member is fastened, allowing the contact faces to maintain air tightness and thereby seal the opening of the pipe joint. When the partition cover is mounted on the pipe joint, the partition cover is pushed against the end face of the joint body that is opposite to the direction in which the fastener member is fastened, thereby making it possible to provide improved tightness between the contact faces. It is thus possible to provide increased air tightness between the contact faces and thereby ensure further improved sealing of the opening of the pipe joint.

Furthermore, when mounted onto the pipe joint, the partition cover may be pushed to the joint body by a surface of the fastener member that is formed substantially perpendicular to the fastening direction.

According to this arrangement, when mounted on the pipe joint, the partition cover is pressed onto the joint body by the plane of the fastener member formed substantially perpendicular to the fastening direction. Accordingly, when the partition cover is mounted on the pipe joint, the partition cover is pushed in the fastening direction to improve tightness of the contact faces between the partition cover and the joint body, thereby providing increased air tightness between the contact faces.

Furthermore, the pipe joint may also be constructed that the sleeve is integrated with the fastener member before the fastener member is fastened to the joint body, and the fastener member being fastened to the joint body causes the sleeve to be cut off and thus separated from the fastener member.

According to this arrangement, the aforementioned cover structure can also be used for the pipe joint configured such that the sleeve is integrated with the fastener member before the fastener member is fastened to the joint body, and the fastener member being fastened to the joint body causes the sleeve to be cut off and thus separated from the fastener member. Use of such a pipe joint makes it possible to prevent the sleeve from being lost before piping connection, and thus eliminates the need for storing spare sleeves, in contrast to a conventional case of the sleeve being formed separately from the fastener member. Additionally, during piping connection, the sleeve does not need to be assembled, thereby facilitating the piping connection. For such a pipe joint, the aforementioned cover structure can be configured, thereby ensuring sealing of the opening of the pipe joint.

Furthermore, the sleeve may also be configured not to be cut off the fastener member when the partition cover is mounted on the pipe joint. According to this arrangement, the sleeve for a pipe joint with the sleeve integrated with the fastener member is configured not to be cut off the fastener member during the mounting of the partition cover on the pipe joint. It is thus possible to avoid such a situation in which the sleeve has already been separated when the pipe joint is used for connection of a pipe. Accordingly, the partition cover is mounted on the pipe joint without impairing the aforementioned effect which is obtained by the sleeve being integrated with the fastener member.

Furthermore, the partition cover may also be formed of a resin member. According to this arrangement, the partition cover is formed of a resin member. This makes it possible to improve the tightness of the site for sealing the opening of the pipe joint and prevent the sleeve from being accidentally deformed.

Furthermore, the pipe joint may be a pipe joint connected with a pipe through which a supercritical coolant used under a supercritical state flows. According to this arrangement, the pipe joint is to be connected with a pipe through which a supercritical coolant used under a supercritical state flows. Thus, when a system in which the pipe joint is used undergoes a pressure-proof test with no pipes connected thereto, high pressure may act upon the partition cover mounted on the pipe joint. In this regard, the aforementioned cover structure has the opening of the pipe joint being reliably sealed. Accordingly, even when high pressure acts during such a pressure-proof test, it is possible to reliably prevent leakage of coolant from between the pipe joint and the partition cover.

Furthermore, the pipe joint may be connected with a pipe through which a carbon dioxide coolant flows. According to this arrangement, since the pipe joint is to be connected with a pipe through which a carbon dioxide coolant flows, the pipe circuit using the pipe joint can be made friendly to the global environment. Furthermore, a system in which the pipe joint is used may undergo a pressure-proof test with no pipes connected thereto, in the case of which high pressure may act upon the mounted partition cover when the carbon dioxide coolant is used under a supercritical state. However, the aforementioned cover structure is configured such that the opening of the pipe joint is reliably sealed, thereby making it possible to reliably prevent leakage of coolant from between the pipe joint and the partition cover during the pressure-proof test.

Furthermore, the pipe joint may be connected with a pipe through which a hydrocarbon coolant flows. According to this arrangement, since the pipe joint is to be connected with a pipe through which a hydrocarbon coolant flows, the pipe circuit using the pipe joint can be made friendly to the global environment. Furthermore, the aforementioned cover structure is configured to reliably seal the opening of the pipe joint. Accordingly, when the system using the pipe joint undergoes a pressure-proof test with no pipes connected thereto, it is possible to reliably prevent leakage of highly flammable hydrocarbon coolant from between the pipe joint and the partition cover.

Furthermore, the present invention is not limited to the aforementioned pipe joint cover structure but may also be applied to the partition cover used in the aforementioned pipe joint cover structure.

Furthermore, a refrigerator according to the present invention is characterized in that the aforementioned pipe joint cover structure is applied to a coolant pipe connection. According to this arrangement, the refrigerator is configured so that the aforementioned pipe joint cover structure is applied to a coolant pipe connection. Accordingly, the refrigerator can be constructed to ensure sealing of the opening of the pipe joint when the partition cover is mounted on the pipe joint. Furthermore, since the sleeve is prevented from being deformed when the partition cover is mounted on the pipe joint, the refrigerator ensures air tightness at the connection of the coolant pipe when the coolant pipe is connected thereto.

Furthermore, a heat pump water heater according to the present invention is characterized in that the aforementioned pipe joint cover structure is applied to a coolant pipe connection. According to this arrangement, the heat pump water heater is constructed so that the aforementioned pipe joint cover structure is applied to a coolant pipe connection. This makes it possible to implement the heat pump water heater that ensures sealing of the opening of the pipe joint when the partition cover is mounted on the pipe joint. Furthermore, the sleeve is prevented from being deformed when the partition cover is mounted on the pipe joint. This makes it possible to implement a heat pump water heater that ensures air tightness during the connection of the coolant pipe when the coolant pipe is connected thereto.

Furthermore, a feed water pipe according to the present invention is characterized in that the aforementioned pipe joint cover structure is applied to a pipe connection. According to this arrangement, the feed water pipe is configured so that the aforementioned pipe joint cover structure is applied to a pipe connection. This makes it possible to implement a feed water pipe that ensures sealing of the opening of the pipe joint when the partition cover is mounted on the pipe joint. Furthermore, the sleeve is prevented from being deformed when the partition cover is mounted on the pipe joint. This makes it possible to implement a feed water pipe that ensures air tightness during the connection of the pipe when the pipe is connected.

Furthermore, a pipe connection method according to the present invention is configured for a pipe joint which uses the aforementioned pipe joint cover structure. The method is characterized by including a first step of removing the fastener member from the joint body to thereby remove the partition cover, a second step of inserting a pipe into the joint hole of the joint body, and a third step of allowing the sleeve to bite into the outer periphery of the pipe by the fastener member being fastened to the joint body.

According to this arrangement, to connect a pipe to the pipe joint which uses the aforementioned pipe joint cover structure, the fastener member is removed from the joint body to remove the partition cover, and then the pipe is inserted into the joint hole of the joint body. Then, the fastener member is fastened to the joint body, thereby allowing the sleeve to bite into the outer periphery of the pipe. Accordingly, the partition cover can be removed for connection of a pipe simply by removing and fastening the fastener member.

Furthermore, an on-site piping installation method according to the present invention is characterized in that the aforementioned pipe connection method is applied to carry out on-site piping installation. According to this arrangement, since the partition cover can be kept mounted on the pipe joint until piping connection, e.g., during transportation, dust particles or moisture intrusion can be prevented. Furthermore, since on-site piping installation is carried out by the fastener member being removed and screwed, etc., the on-site piping installation can be conducted without using special devices or tools.

DETAILED DESCRIPTION OF THE PREFERRED EMBODIMENTS

Now, with reference to FIG. 1, a description will be made of a pipe joint cover structure according to a first embodiment according of the present invention.

First Embodiment

Figure 1:
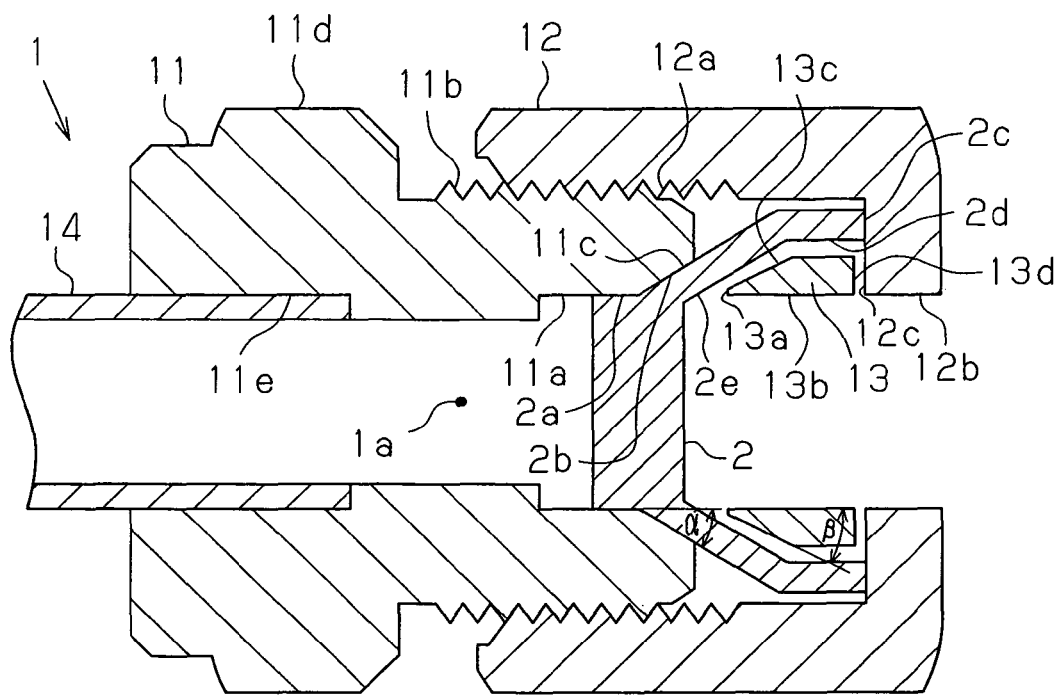
FIG. 1 is a cross-sectional view illustrating a pipe joint cover structure according to a first embodiment.

FIG. 1 is a cross-sectional view illustrating the construction of a pipe joint cover structure according to the present embodiment. The pipe joint cover structure is constructed of a pipe joint 1 to be connected with a pipe, and a partition cover 2 provided to be removable from the pipe joint 1. The partition cover 2 is configured to seal an opening 1a of the pipe joint 1 when mounted on the pipe joint 1.

The pipe joint 1 includes a joint body 11 to be connected with a pipe, a nut 12 serving as a fastener member to be screwed onto the joint body 11, and a sleeve 13 to be interposed between the joint body 11 and the nut 12 upon connection of a pipe. The pipe joint 1 is a flareless joint. To connect a pipe to the pipe joint 1, the pipe is inserted into a joint hole 11a formed on the inner periphery of the joint body 11, and then the nut 12 is screwed onto the joint body 11. This allows a front end portion 13a of the sleeve 13 to bite into the outer periphery of the pipe, thereby connecting the pipe to the joint body 11.

The joint body 11 has the joint hole 11a into which the connected pipe is inserted, an external thread portion 11b onto which the nut 12 is screwed, a guide face 11c for guiding an outer peripheral surface 13c of the sleeve 13 when the sleeve 13 bites into the pipe, and a nut portion 11d formed on the outer periphery.

The joint hole 11a is formed in a cylindrical shape, and has an inner diameter that is substantially equal to the outer diameter of the inserted pipe. The external thread portion 11b has screw threads formed on the outer periphery of the joint hole 11a to screw into the nut 12. The guide face 11c is located at the inlet of the joint hole 11a and formed in a conical shape. This conical face serves to guide the outer peripheral surface 13c of the sleeve 13 when the nut 12 is tightened securely upon connection of a pipe, thereby allowing the front end portion 13a of the sleeve 13 to bite into the outer peripheral surface of the pipe. The nut portion 11d is configured to hold the joint body 11 when the nut 12 is tightened securely.

Furthermore, the joint body 11 has a cylindrical socket portion 11e formed opposite to the joint hole 11a, with a pipe 14 fixed to the socket portion 11e by brazing or the like. The socket portion 11e and the joint hole 11a communicate with each other, and this communication through hole serves as the opening 1a of the pipe joint 1.

The nut 12 has an internal thread portion 12a to be screwed onto the external thread portion 11b of the joint body 11, a holding hole 12b for holding the outer periphery of the connected pipe, and an inner surface 12c for press forcing the sleeve 13 when the nut 12 is tightened securely upon connection of a pipe.

The internal thread portion 12a is formed on the inner peripheral surface which is screwed onto the joint body 11. The holding hole 12b is formed in a cylindrical shape and has an inner diameter that is substantially equal to the outer diameter of the held pipe. The inner surface 12c is formed on a side of a projected portion, which forms the holding hole 12b and is located closer to the internal thread portion 12a, substantially perpendicular to the direction of the nut 12 being screwed. The inner surface 12c corresponds to a surface of the fastener member formed substantially perpendicular to the fastening direction.

The sleeve 13 has the front end portion 13a which bites into the outer periphery of a pipe upon connection of the pipe, an inner peripheral surface 13b which opposes the pipe connected, the outer peripheral surface 13c which is guided by the guide face 11c of the joint body 11 when the front end portion 13a bites in the pipe, and a rear end surface 13d to which pressing force is applied when the front end portion 13a bites into the pipe.

The inner peripheral surface 13b is formed in a cylindrical shape, and has an inner diameter that is substantially equal to the outer diameter of the connected pipe. The outer peripheral surface 13c is located on the outer peripheral side of the inner peripheral surface 13b, and formed in a conical shape. The conical face of the outer peripheral surface 13c has a tilt angle $\beta$ which is less than a tilt angle $\alpha$ of the conical face of the guide face 11c of the joint body 11. Thus, when the nut 12 is tightened securely upon connection of a pipe, the front end portion 13a of the sleeve 13 is deformed radially inward to thereby bite into the outer peripheral surface of the pipe. The rear end surface 13d is formed opposite to the front end portion 13a of the sleeve 13 to oppose the inner surface 12c of the nut 12. When the nut 12 is tightened securely upon connection of a pipe, the rear end surface 13d receives a pressing force from the inner surface 12c of the nut 12 in the direction of the nut 12 being screwed.

Next, a description will be made of the partition cover 2 which seals the opening 1a of the pipe joint 1. When mounted on the pipe joint 1, the partition cover 2, which is formed of a resin member, is sandwiched between the joint body 11 and the nut 12 as shown in FIG. 1. The partition cover 2 has a fitting portion 2a which fits into the joint hole 11a of the joint body 11 when mounted on the pipe joint 1. The partition cover 2 is radially positioned by the fitting portion 2a being fitted into the joint hole 11a. Furthermore, the partition cover 2 has a conical contact face 2b and a press face 2c, which are brought into contact with the guide face 11c of the joint body 11 and the inner surface 12c of the nut 12, respectively, when the partition cover 2 is mounted on the pipe joint 1. The contact face 2b being brought into contact with the guide face 11c and the press face 2c being brought into contact with the inner surface 12c allow the partition cover 2 to be positioned in the direction of the nut 12 being screwed. In this manner, the partition cover 2 is supported at the fitting portion 2a, the contact face 2b, and the press face 2c relative to the pipe joint 1.

Furthermore, an inner peripheral surface 2d of the partition cover 2, a conical tilted face 2e formed on the inner peripheral surface 2d near the fitting portion 2a, and the inner surface 12c of the nut 12 define a space. As shown in FIG. 1, this space is configured to be greater than the outer dimensions of the sleeve 13. Accordingly, this allows the partition cover 2 not to press the sleeve 13 when mounted on the pipe joint 1, thereby preventing the sleeve 13 from being deformed.

To install the partition cover 2 in the pipe joint 1, first, the fitting portion 2a of the partition cover 2 is fitted into the joint hole 11a of the joint body 11. Next, the sleeve 13 is placed on the inner peripheral surface 2d of the partition cover 2, and then the internal thread portion 12a of the nut 12 is screwed onto the external thread portion 11b of the joint body 11. This allows the inner surface 12c of the nut 12 and the press face 2c of the partition cover 2 to be brought into contact with each other, causing pressing force onto the partition cover 2 in the screwing direction. Thus, the guide face 11c of the joint body 11 and the contact face 2b of the partition cover 2 are brought into contact with each other, thereby mounting the partition cover 2 in the pipe joint 1. At this time, since the inner surface 12c of the nut 12 presses the press face 2c of the partition cover 2, the guide face 11c of the joint body 11 and the contact face 2b of the partition cover 2 are brought into tight contact with each other, thereby ensuring air tightness between the contact faces. In this manner, the opening 1a of the pipe joint 1 is sealed with the partition cover 2. In addition, in the aforementioned method for mounting the partition cover 2, the partition cover 2 is attached to the joint body 11 and thereafter the nut 12 is tightened securely; however, alternatively, the partition cover 2 may be attached to the nut 12, and thereafter the nut 12 may be tightened securely.

In this manner, the pipe joint cover structure is configured such that the partition cover 2 is sandwiched between the joint body 11 and the nut 12 by the nut 12 being screwed onto the joint body 11, so that the partition cover 2 is mounted without pressing the sleeve 13.

Figure 2A:
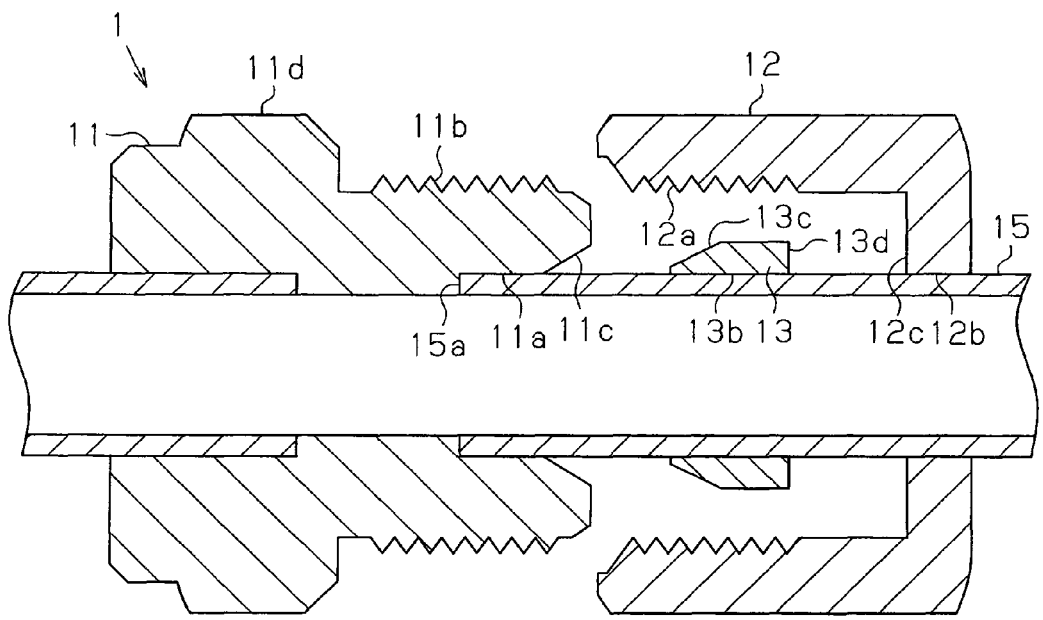
FIG. 2(a) is a cross-sectional view illustrating a pipe joint before a pipe is connected thereto.
Figure 2B:
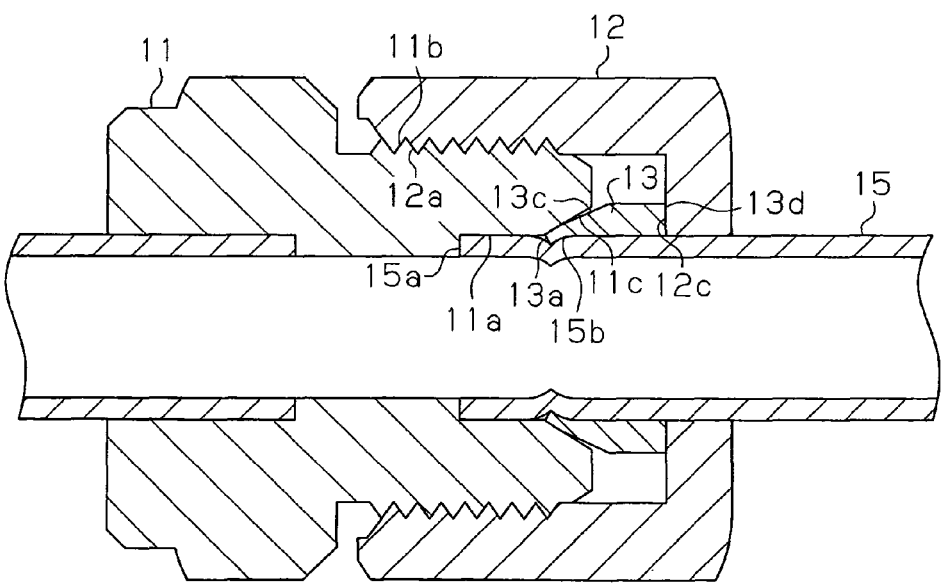
FIG. 2(b) is a cross-sectional view illustrating the pipe joint with a pipe connected thereto.

Now, a description will be made of a pipe connection method for changing the state of the pipe joint 1 from a state in which the partition cover 2 is mounted as shown in FIG. 1 to the pipe joint 1 to a state in which a pipe 15 is connected as shown in FIG. 2(b). To connect the pipe 15 to the pipe joint 1, first, the internal thread portion 12a of the nut 12 is unscrewed from the external thread portion 11b of the joint body 11. Then, the nut 12 is removed from the joint body 11, and the sleeve 13 and the partition cover 2 are then removed (first step).

Next, as shown in FIG. 2(a), the pipe 15 is passed through the holding hole 12b of the nut 12 on the inner peripheral surface 13b of the sleeve 13, thereby inserting a distal end portion 15a of the pipe 15 into the joint hole 11a of the joint body 11 (second step). Then, while the nut portion 11d of the joint body 11 is being held, the internal thread portion 12a of the nut 12 is screwed onto the external thread portion 11b of the joint body 11. As the nut 12 is screwed, the guide face 11c of the joint body 11 is brought into contact with the front end portion 13a of the sleeve 13, and the inner surface 12c of the nut 12 is brought into contact with the rear end surface 13d of the sleeve 13. As the nut 12 is screwed, the rear end surface 13d of the sleeve 13 receives pressing force from the inner surface 12c of the nut 12, so that the outer peripheral surface 13c of the sleeve 13 is guided on the guide face 11c of the joint body 11. This allows the front end portion 13a of the sleeve 13 to bite into the outer peripheral surface 15b of the pipe 15 as shown in FIG. 2(b) (third step). Thus, the pipe 15 is connected to the joint hole 11a of the joint body 11.

In this manner, the partition cover 2 can be removed from the pipe joint 1 and then the pipe 15 can be connected to the pipe joint 1 by simply removing and then tightening the nut 12. Furthermore, with the partition cover 2 mounted on the pipe joint 1, the sleeve 13 is not deformed, and thus air tightness can be ensured at the biting portion of the sleeve 13 when the pipe 15 is connected to the pipe joint 1.

The following advantages are obtained according to the aforementioned first embodiment.

(1) When the partition cover 2 is mounted on the pipe joint 1, the partition cover 2 is sandwiched between the joint body 11 and the nut 12 by the nut 12 being screwed onto the joint body 11. Accordingly, the partition cover 2 is supported with the fitting portion 2a, the contact face 2b, and the press face 2c, thereby ensuring sealing of the opening 1a of the pipe joint 1.

(2) The partition cover 2 is supported not to press the sleeve 13 when the partition cover 2 is mounted on the pipe joint 1, thereby making it possible to prevent the sleeve 13 from being deformed by the partition cover 2 being mounted. That is, the partition cover 2 is mounted on the pipe joint 1 without affecting the front end portion 13a of the sleeve 13 serving as the portion biting into a pipe. It is thus possible to avoid such a situation in which the sleeve 13 cannot be used because of its deformation when the partition cover 2 is removed for connection of a pipe, or air tightness is degraded after piping connection because of the sleeve 13 having been deformed.

(3) When the partition cover 2 is mounted on the pipe joint 1, the contact face 2b of the partition cover 2 is brought into tight contact with the guide face 11c of the joint body 11. The conical contact face 2b and the conical guide face 11c are brought into tight contact with each other in this manner. This wedge effect increases the degree of the tight contact. Accordingly, the air tightness between the contact faces is further improved to thereby ensure further improved sealing of the opening 1a of the pipe joint 1.

(4) When the partition cover 2 is mounted on the pipe joint 1, the press face 2c of the partition cover 2 receives a pressing force from the inner surface 12c of the nut 12 formed on substantially perpendicular to the screwing direction. Accordingly, the partition cover 2 is pushed in the direction of the nut 12 being screwed in order to enhance the tightness between the contact face 2b of the partition cover 2 and the guide face 11c of the joint body 11, thereby providing increased air tightness between the contact faces.

(5) Since the partition cover 2 is made of a resin member, the tightness between the contact face 2b of the partition cover 2 and the guide face 11c of the joint body 11 is improved. It is also possible to prevent the sleeve 13 from being accidentally deformed.

Second Embodiment

Next, with reference to FIG. 3, a description will be made of a pipe joint cover structure according to a second embodiment of the present invention. The second embodiment is the same as the first embodiment in the basic construction of the pipe joint 1, a flareless joint, but different from the first embodiment in how the partition cover 3 is supported with respect to the pipe joint 1. In addition, in the embodiments described below, the same components as those of the first embodiment will be indicated with the same symbols, and may be described in a simplified manner or not explained repeatedly.

Figure 3:
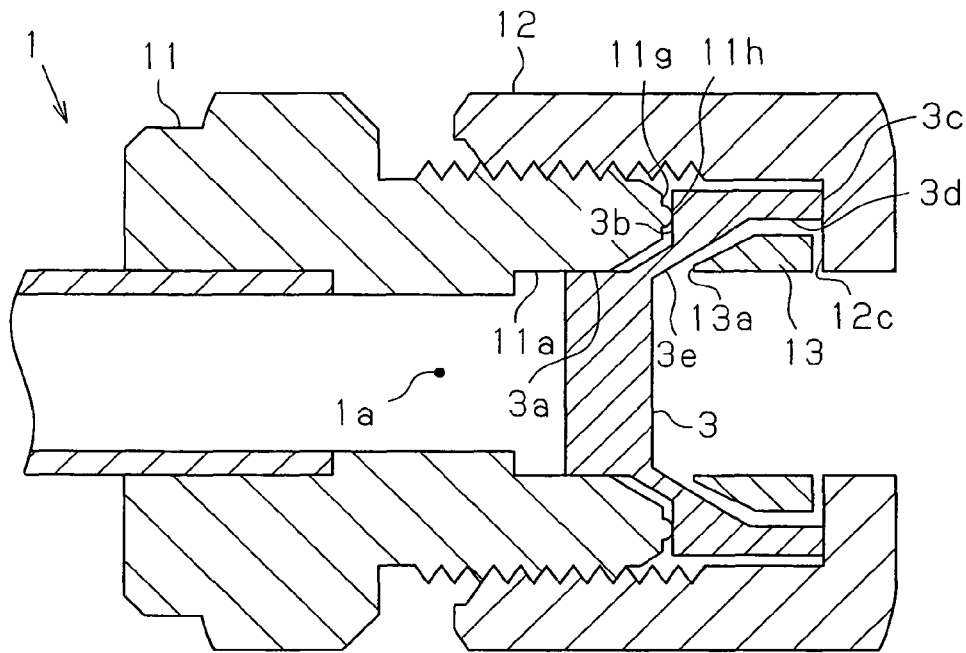
FIG. 3 is a cross-sectional view illustrating a pipe joint cover structure according to a second embodiment.

FIG. 3 is a cross-sectional view illustrating the construction of a pipe joint cover structure according to this embodiment. The pipe joint cover structure includes the pipe joint 1 and the partition cover 3 provided to be removable from the pipe joint 1. The partition cover 3 is configured to seal the opening 1a of the pipe joint 1 when mounted on the pipe joint 1.

When mounted on the pipe joint 1, the partition cover 3, which is formed of a resin member, is sandwiched between the joint body 11 and the nut 12 as shown in FIG. 3. The partition cover 3 has a fitting portion 3a which fits into the joint hole 11a of the joint body 11 when mounted on the pipe joint 1. The partition cover 3 is radially positioned by the fitting portion 3a being fitted into the joint hole 11a. Furthermore, the partition cover 3 has a contact face 3b and a press face 3c. When the partition cover 3 is mounted on the pipe joint 1, the contact face 3b is brought into contact with a projection 11h provided on a side face 11g of the joint body 11 or on the side from which the nut 12 is screwed, and the press face 3c is brought into contact with the inner surface 12c of the nut 12. The contact face 3b and the press face 3c are brought into contact with the projection 11h and the inner surface 12c, respectively, thereby allowing the partition cover 3 to be positioned in the direction of the nut 12 being screwed. In this manner, the partition cover 3 is supported at the fitting portion 3a, the contact face 3b, and the press face 3c with respect to the pipe joint 1.

Furthermore, the press face 3c of the partition cover 3 receives pressing force from the inner surface 12c of the nut 12, and the projection 11h of the joint body 11 and the contact face 3b of the partition cover 3 are brought into tight contact with each other, thereby ensuring air tightness between the contact faces. In this manner, the opening 1a of the pipe joint 1 is sealed with the partition cover 3. The projection 11h corresponds to the end face of the joint body on the side on which the fastener member is fastened.

Furthermore, the inner peripheral surface 3d of the partition cover 3, a conical tilted face 3e formed on the inner peripheral surface 3d near the fitting portion 3a, and the inner surface 12c of the nut 12 define a space. As shown in FIG. 3, this space is configured to be greater than the outer dimensions of the sleeve 13. Accordingly, this allows the partition cover 3 not to press the sleeve 13 when mounted on the pipe joint 1, thereby preventing the sleeve 13 from being deformed.

In this manner, the pipe joint cover structure is configured such that the partition cover 3 is sandwiched between the joint body 11 and the nut 12 by the nut 12 being screwed onto the joint body 11, so that the partition cover 3 is mounted without pressing the sleeve 13.

The aforementioned second embodiment provides the following advantage in addition to the advantages of the items (1), (2), (4), and (5) of the first embodiment.

(6) In the second embodiment, when the partition cover 3 is mounted on the pipe joint 1, the contact face 3b of the partition cover 3 and the projection 11h of the joint body 11 are brought into tight contact with each other. In this manner, the contact face 3b of the partition cover 3 is pushed against the projection 11h in the direction opposite to the direction of the nut 12 being screwed, thereby providing increased tightness between the contact faces. Accordingly, the air tightness between the contact faces can be improved to thereby ensure further improved sealing of the opening 1a of the pipe joint 1.

Third Embodiment

Next, with reference to FIGS. 4 and 5, a description will be made of a pipe joint cover structure according to a third embodiment of the present invention. A pipe joint 21 according to the third embodiment is configured so that a sleeve 33 is integrated with a nut 32 before piping connection, and the nut 32 is screwed onto a joint body 31, thereby allowing the sleeve 33 to be cut off and thus separated from the nut 32. In the third embodiment, the pipe joint cover structure according to the present invention is applied to the pipe joint 21 constructed in this manner. In addition, in the embodiment described below, the same components as those of the first embodiment will be indicated with the same symbols, and may be described in a simplified manner or not explained repeatedly.

Figure 4A:
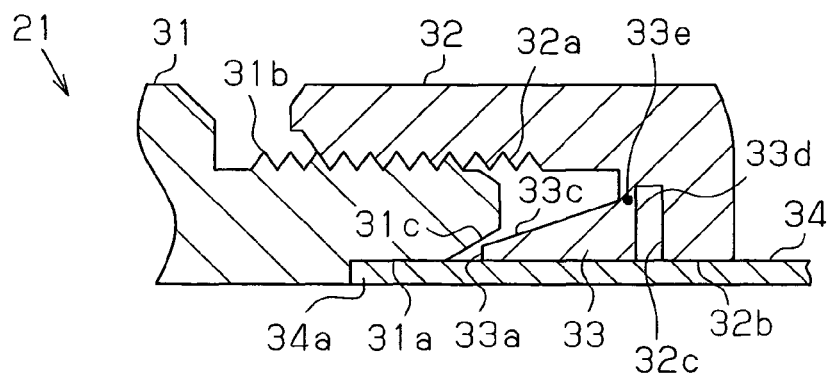
FIG. 4(a) is a cross-sectional view illustrating a pipe joint integrated with a sleeve with the sleeve yet to be cut off.
Figure 4B:
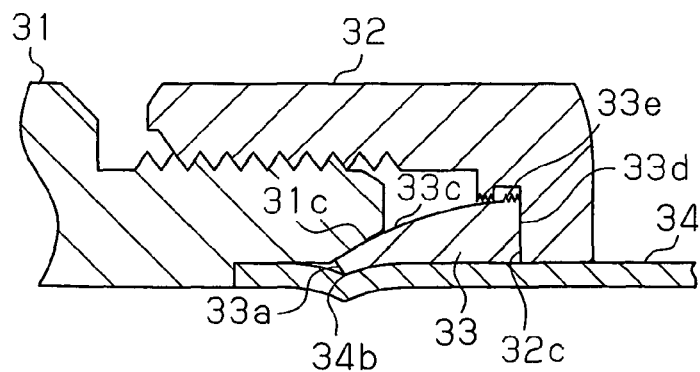
FIG. 4(b) is a cross-sectional view illustrating the pipe joint with the sleeve biting into the pipe.

Now, with reference to FIG. 4, a description will be made of the construction of the pipe joint 21 used for this embodiment. The pipe joint 21 includes the joint body 31 to be connected with a pipe, the nut 32 serving as a fastener member to be screwed onto the joint body 31, and the sleeve 33 to be interposed between the joint body 31 and the nut 32 upon connection of a pipe. As shown in FIG. 4(a), the sleeve 33 is integrated with the nut 32, such that the sleeve 33 and the nut 32 are coupled to each other via a base portion 33e. To connect a pipe 34 to the pipe joint 21, the pipe 34 is permitted to pass through a holding hole 32b of the nut 32, thereby inserting a distal end portion 34a of the pipe 34 into a joint hole 31a of the joint body 31. Then, an internal thread portion 32a of the nut 32 is screwed onto an external thread portion 31b of the joint body 31 (FIG. 4(a)).

As the nut 32 is tightened securely, a guide face 31c of the joint body 31 is brought into contact with a front end portion 33a of the sleeve 33 with pressing force being increased therebetween as the nut 32 is screwed. This causes an increasing shearing force to act upon the base portion 33e of the sleeve 33 in the direction of the nut 32 being screwed, with the result that the base portion 33e of the sleeve 33 is cut off and thus the nut 32 and the sleeve 33 are separated from each other. When the nut 32 is further screwed, the guide face 31c of the joint body 31 is brought into contact with the front end portion 33a of the sleeve 33, while an inner surface 32c of the nut 32 is brought into contact with a rear end surface 33d of the sleeve 33. Then, as the nut 32 is screwed, the rear end surface 33d of the sleeve 33 receives a pressing force from the inner surface 32c of the nut 32, so that the outer peripheral surface 33c of the sleeve 33 is guided on the guide face 31c of the joint body 31. This will cause the front end portion 33a of the sleeve 33 to bite into the outer peripheral surface 34b of the pipe 34 (FIG. 4(b)). In this manner, the pipe joint 21 connects the pipe 34 to the joint body 31 by permitting the front end portion 33a of the sleeve 33 to bite into the outer peripheral surface 34b of the pipe 34.

In addition, a description will be made of a pipe joint cover structure that is applied to the pipe joint 21. FIG. 5 is a cross-sectional view illustrating the construction of a pipe joint cover structure according to this embodiment. The pipe joint cover structure includes the aforementioned pipe joint 21, and a partition cover 22 provided to be removable from the pipe joint 21. The partition cover 22 is configured to seal the opening 21a of the pipe joint 21 when mounted on the pipe joint 21.

Figure 5:
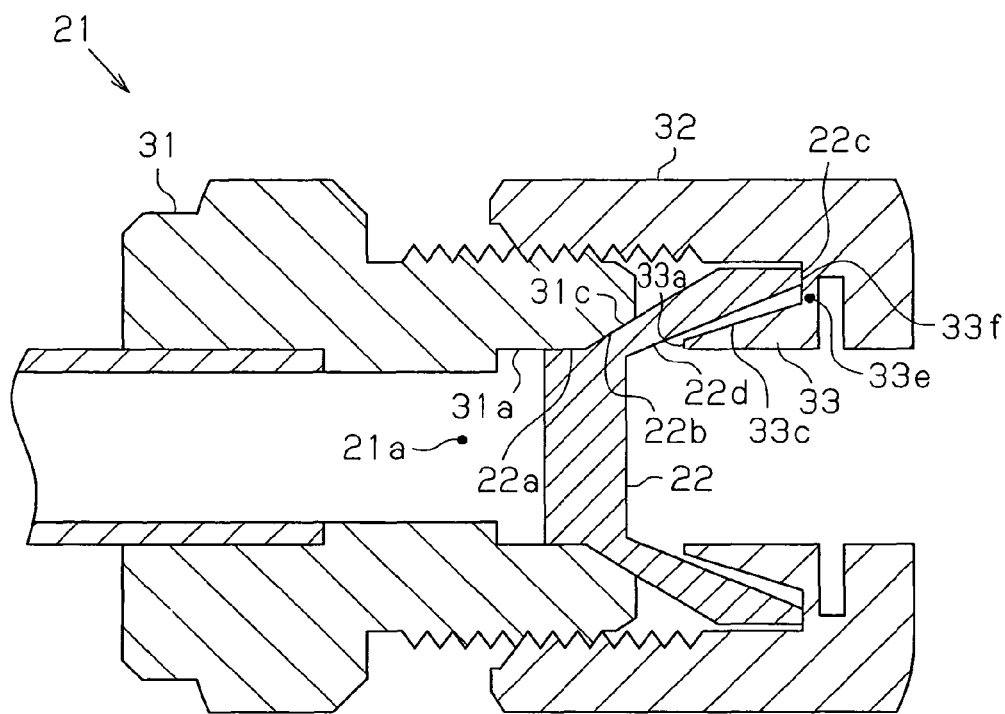
FIG. 5 is a cross-sectional view illustrating a pipe joint cover structure according to a third embodiment.

When mounted on the pipe joint 21, the partition cover 22, which is formed of a resin member, is sandwiched between the joint body 31 and the nut 32 as shown in FIG. 5. The partition cover 22 has a fitting portion 22a which fits into the joint hole 31a of the joint body 31 when mounted on the pipe joint 21. The partition cover 22 is radially positioned by the fitting portion 22a being fitted into the joint hole 31a. Furthermore, the partition cover 22 has a conical contact face 22b and a press face 22c. When the partition cover 22 is mounted on the pipe joint 21, the contact face 22b is brought into contact with the guide face 31c of the joint body 31, and the press face 22c is brought into contact with a side face 33f of the base portion 33e of the sleeve 33. The press face 22c of the partition cover 22 is configured to be brought into contact with the side face 33f, which is radially outside of the base portion 33e of the sleeve 33 which is to be cut off during piping connection. This prevents the sleeve 33 from being cut off the nut 32 due to a pressing force by the press face 22c during the mounting of the partition cover 22. The partition cover 22 is positioned in the direction of the nut 32 being screwed by the contact face 22b and the guide face 31c being brought into contact with each other and by the press face 22c and the side face 33f being brought into contact with each other. In this manner, the partition cover 22 is supported at the fitting portion 22a, the contact face 22b, and the press face 22c with respect to the pipe joint 21. The side face 33f corresponds to a surface of the fastener member formed substantially perpendicular to the fastening direction.

Furthermore, as shown in FIG. 5, the inner peripheral surface 22d of the partition cover 22 is configured so not to contact with the outer peripheral surface 33c of the sleeve 33. Accordingly, the sleeve 33 can be made free from pressing force when the partition cover 22 is mounted on the pipe joint 21, thereby preventing the sleeve 33 from being deformed.

To mount the partition cover 22 on the pipe joint 21, first, the fitting portion 22a of the partition cover 22 is fitted into the joint hole 31a of the joint body 31. Next, the internal thread portion 32a of the nut 32 is screwed onto the external thread portion 31b of the joint body 31. This allows the side face 33f of the sleeve 33 and the press face 22c of the partition cover 22 to be brought into contact with each other, thereby pressing the partition cover 22 in the screwing direction. Then, the guide face 31c of the joint body 31 and the contact face 22b of the partition cover 22 are brought into contact with each other, thereby allowing the partition cover 22 to be mounted on the pipe joint 21. At this time, the side face 33f of the sleeve 33 presses the press face 22c of the partition cover 22 causing the guide face 31c of the joint body 31 and the contact face 22b of the partition cover 22 to be brought into tight contact with each other, thereby ensuring air tightness between the contact faces. In this manner, the opening 21a of the pipe joint 21 is sealed with the partition cover 22. In addition, in the aforementioned method for mounting the partition cover 22, the partition cover 22 is attached to the joint body 31 and thereafter the nut 32 is tightened securely; however, alternatively, the partition cover 22 may be attached to the nut 32, and thereafter the nut 32 may be tightened securely.

In this manner, the pipe joint cover structure is configured such that the partition cover 22 is sandwiched between the joint body 31 and the nut 32 by the nut 32 being screwed onto the joint body 31, so that the partition cover 22 is mounted without pressing the sleeve 33.

The aforementioned third embodiment provides the following advantages in addition to the advantages of the items (1) to (5) of the first embodiment.

(7) The pipe joint 21 is constructed so that the sleeve 33 is integrated with the nut 32 before piping connection, and the nut 32 is screwed onto the joint body 31, thereby allowing the sleeve 33 to be cut off and thus separated from the nut 32. Accordingly, in contrast to the sleeve 33 formed separately from the nut 32, it is possible to prevent the sleeve 33 from being lost before piping connection, and thus it is not necessary to store spare sleeves 33. Furthermore, during piping connection, the sleeve 33 does not need to be assembled, thereby facilitating the piping connection. For such a pipe joint 21, it is also possible to mount the pipe joint cover structure which ensures sealing of the opening 21a of the pipe joint 21 and prevents deformation of the sleeve 33.

(8) The press face 22c of the partition cover 22 is constructed to be brought into contact with the side face 33f, which is radially outside of the base portion 33e of the sleeve 33 which is to be cut off during piping connection. This prevents the sleeve 33 from being cut off the nut 32 due to a pressing force by the press face 22c during the mounting of the partition cover 22. It is thus possible to avoid such a situation in which the sleeve has already been separated when the pipe joint 21 is used for piping connection. Accordingly, the partition cover 22 can be mounted on the pipe joint 21 without impairment of the aforementioned advantage (7), which is obtained by the sleeve 33 being integrated with the nut 32.

Fourth Embodiment

Next, with reference to FIG. 6, a description will be made of a pipe joint cover structure according to a fourth embodiment of the present invention. The fourth embodiment is the same as the third embodiment in the basic construction of the pipe joint 21, a flareless joint, but different from the third embodiment in how a partition cover 23 is supported with respect to the pipe joint 21. In addition, in the embodiment described below, the same components as those of the third embodiment will be indicated with the same symbols, and may be described in a simplified manner or not explained repeatedly.

Figure 6:
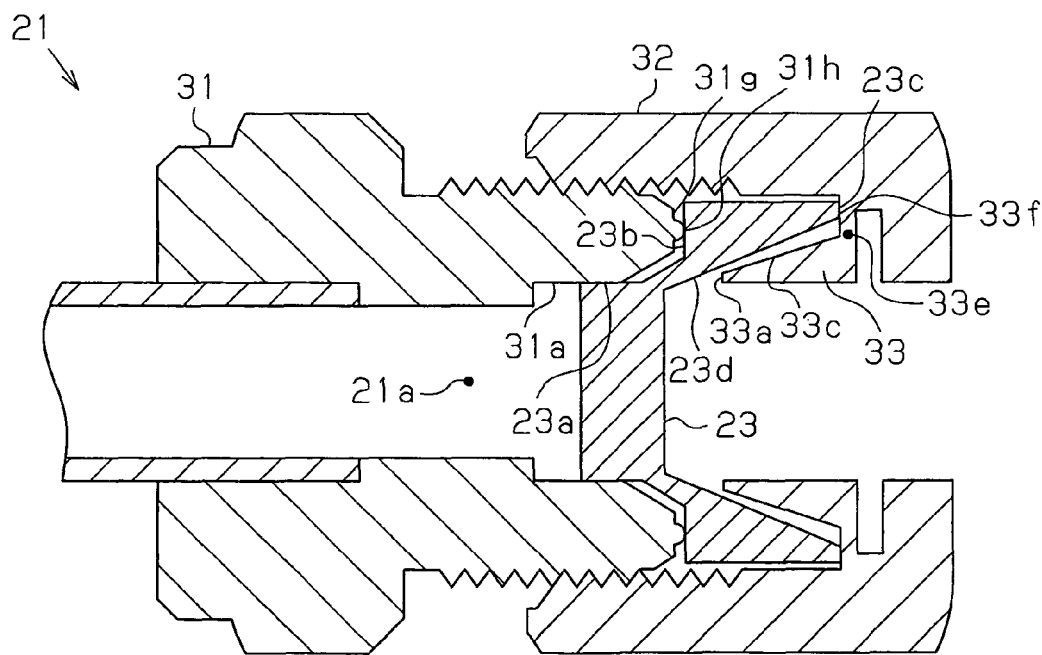
FIG. 6 is a cross-sectional view illustrating a pipe joint cover structure according to a fourth embodiment.

FIG. 6 is a cross-sectional view illustrating the construction of a pipe joint cover structure according to this embodiment. The pipe joint cover structure includes the pipe joint 21, and the partition cover 23 provided to be removable from the pipe joint 21. The partition cover 23 is configured to seal the opening 21a of the pipe joint 21 when mounted on the pipe joint 21.

When mounted on the pipe joint 21, the partition cover 23, which is formed of a resin member, is sandwiched between the joint body 31 and the nut 32 as shown in FIG. 6. The partition cover 23 has a fitting portion 23a which fits into the joint hole 31a of the joint body 31 when mounted on the pipe joint 21. The partition cover 23 is radially positioned by the fitting portion 23a being fitted into the joint hole 31a. Furthermore, the partition cover 23 has a contact face 23b and a press face 23c. When the partition cover 23 is mounted on the pipe joint 21, the contact face 23b is brought into contact with a projection 31h provided on a side face 31g of the joint body 31 or on the side from which the nut 32 is screwed, and the press face 23c is brought into contact with the side face 33f of the sleeve 33. The partition cover 23 is positioned in the direction of the nut 32 being screwed, by the contact face 23b and the projection 31h being brought into contact with each other and by the press face 23c and the side face 33f being brought into contact with each other. In this manner, the partition cover 23 is supported at the fitting portion 23a, and the contact face 23b, and the press face 23c with respect to the pipe joint 21.

Furthermore, the press face 23c of the partition cover 23 receives pressing force from the side face 33f of the sleeve 33, and the projection 31h of the joint body 31 and the contact face 23b of the partition cover 23 are brought into tight contact with each other, thereby ensuring air tightness between the contact faces. In this manner, the opening 21a of the pipe joint 21 is sealed with the partition cover 23. The projection 31h corresponds to the end face of the joint body on the side on which the fastener member is fastened.

Furthermore, as shown in FIG. 6, the inner peripheral surface 23d of the partition cover 23 is configured so as not to contact with the outer peripheral surface 33c of the sleeve 33. Accordingly, the sleeve 33 is made free from pressure when the partition cover 23 is mounted on the pipe joint 21, thereby preventing the sleeve 33 from being deformed.

In this manner, the pipe joint cover structure is configured such that the partition cover 23 is sandwiched between the joint body 31 and the nut 32 by the nut 32 being screwed onto the joint body 31, so that the partition cover 23 is mounted without pressing the sleeve 33.

The aforementioned fourth embodiment provides the advantages of the items (7) and (8) of the third embodiment in addition to the effect of the second embodiment.

In addition, the aforementioned embodiments may be modified as follows.

In the third and fourth embodiment, the pipe joint 21 is constructed so that the sleeve 33 is integrated with the nut 32. However, it may also be constructed that the sleeve 33 is connected to the nut 32 with adhesive or by snap-fit.

In the third and fourth embodiment, the pipe joint 21 is constructed so that the sleeve 33 is integrated with the nut 32. However, it may also be constructed that the sleeve 33 is integrated with the joint body 31, and the nut 32 is screwed onto the joint body 31, thereby allowing the sleeve 33 to be cut off and thus separated from the joint body 31.

In the first to fourth embodiments, the partition cover 2, 3, 22, or 23 is formed of a resin member; however, it may also be formed of a material other than a resin material, e.g., of metal.

Figure 7:
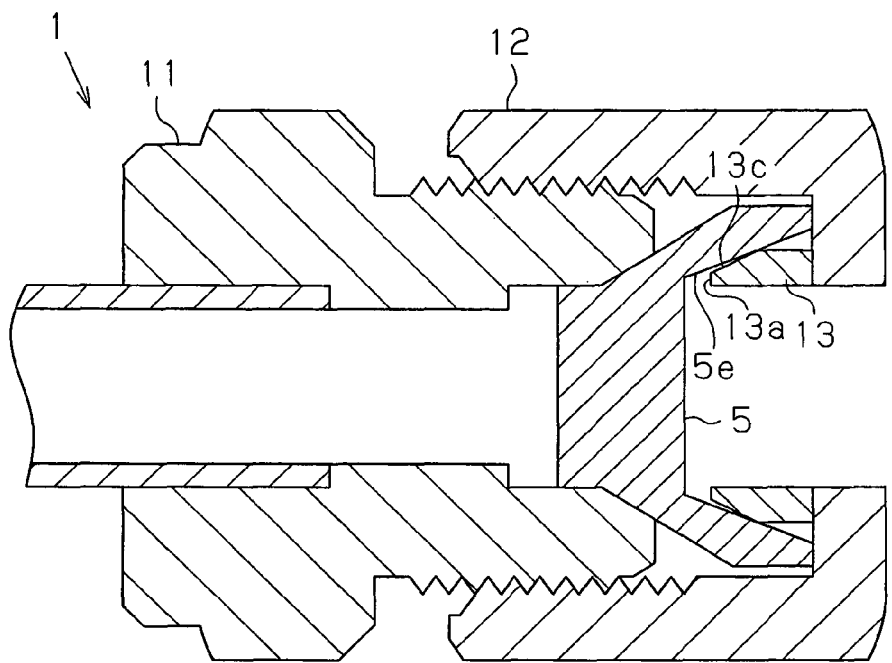
FIG. 7 is a cross-sectional view illustrating a pipe joint cover structure in which a partition cover is mounted to press a sleeve.

In the first to fourth embodiments, the sleeve 13 or 33 is configured to receive no pressing force from the partition cover 2, 3, 22, or 23 when mounted on the pipe joint 1 or 21. However, as long as the partition cover 2, 3, 22, or 23 is mounted so as not to affect the front end portion 13a or 33a, the partition cover 2, 3, 22, or 23 may also be constructed that the sleeve 13 or 33 receives pressing force. FIG. 7 is a cross-sectional view illustrating a pipe joint cover structure applied to the pipe joint 1 in which a partition cover is mounted with pressing force acting upon the sleeve. The pipe joint cover structure includes the pipe joint 1, and a partition cover 5 provided to be removable from the pipe joint 1. As with the first embodiment, when mounted on the pipe joint 1, the partition cover 5 is sandwiched between the joint body 11 and the nut 12. When the partition cover 5 is mounted on the pipe joint 1, a conical tilted face 5e facing the outer peripheral surface 13c of the sleeve 13 is brought into contact with part of the outer peripheral surface 13c to elastically press the sleeve 13. Accordingly, the partition cover 5 is mounted on the pipe joint 1 in a manner that the partition cover 5 elastically deforms to thereby prevent the sleeve 13 from being changed in shape even when the sleeve 13 receives pressing force. Furthermore, the partition cover 5 is not brought into contact with the front end portion 13a of the sleeve 13 even when the sleeve 13 is deformed due to the mounting of the partition cover 5. It is thus possible not to affect the front end portion 13a of the sleeve 13 which bites into a pipe. Accordingly, regardless of whether the sleeve 13 is deformed, it is possible to ensure air tightness during the pipe connection when the pipe joint 1 is used for piping connection.

Figure 8:
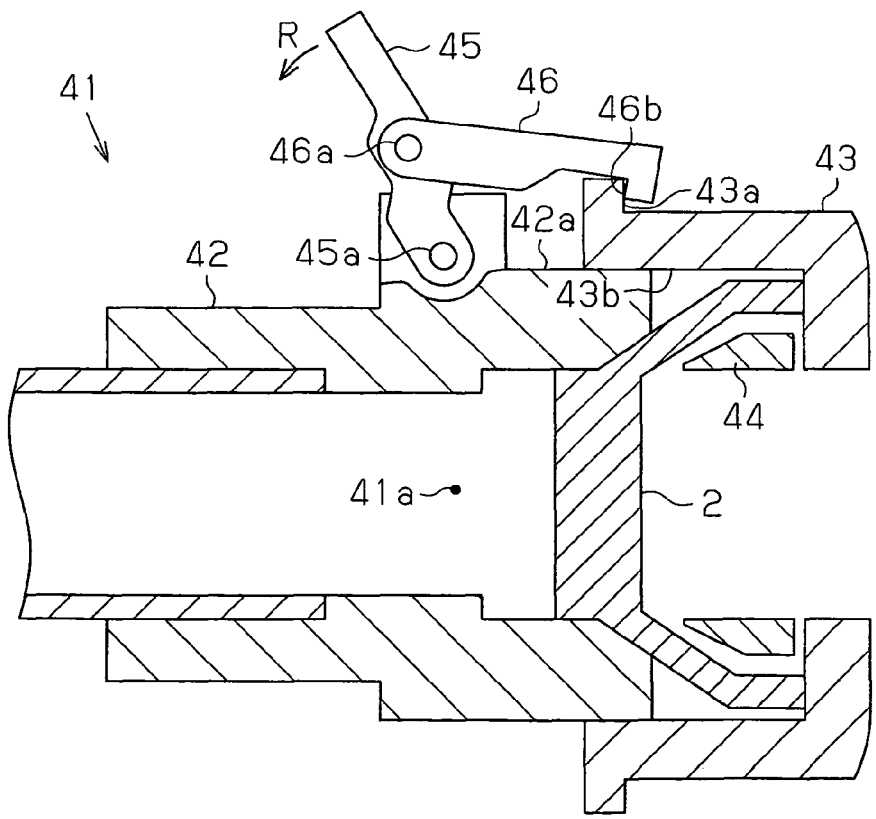
FIG. 8 is a cross-sectional view illustrating a pipe joint cover structure in which no screw thread structure is used for a pipe joint.

In the first to fourth embodiments, the pipe joint 1 or 21 is constructed so that the nut 12 or 32 is screwed onto the joint body 11 or 31 to thereby connect a pipe to the joint body 11 or 31. However, a pipe may also be connected to the joint body without using screw thread structure between the joint body and the nut. FIG. 8 is a cross-sectional view illustrating a pipe joint cover structure in which no screw thread structure is used for a pipe joint. This pipe joint cover structure includes a pipe joint 41, and the partition cover 2 constructed in the same manner as in the first embodiment. The pipe joint 41 includes a joint body 42 into which a pipe is inserted, a fastener member 43 to be fastened to the joint body 42, and a sleeve 44 to bite into the outer peripheral surface of the pipe. An actuating lever 45 is rotatably supported on the outer periphery of the joint body 42. At an intermediate position on the actuating lever 45, a lock lever 46 is rotatably supported. A pivot shaft 46a of the lock lever 46 is disposed parallel to a pivot shaft 45a of the actuating lever 45. A lock pawl 46b provided on an end of the lock lever 46 is configured to engage a projected portion 43a provided on the outer peripheral surface of the fastener member 43. Furthermore, a cylindrical sliding face 42a provided on the joint body 42 engages a sliding face 43b provided on the fastener member 43, and is configured to allow the fastener member 43 to move only in the axial direction of the joint body 42. To use the pipe joint 41 for connection of a pipe, the actuating lever 45 is rotated in direction R to thereby connect the fastener member 43 to the joint body 42, allowing the sleeve 44 to bite into the outer periphery of the pipe. Such a pipe joint 41 can also be constructed that the fastener member 43 is connected to the joint body 42 allowing the partition cover 2 to be sandwiched between the joint body 42 and the fastener member 43, thereby sealing the opening 41a of the pipe joint.

Figure 9:
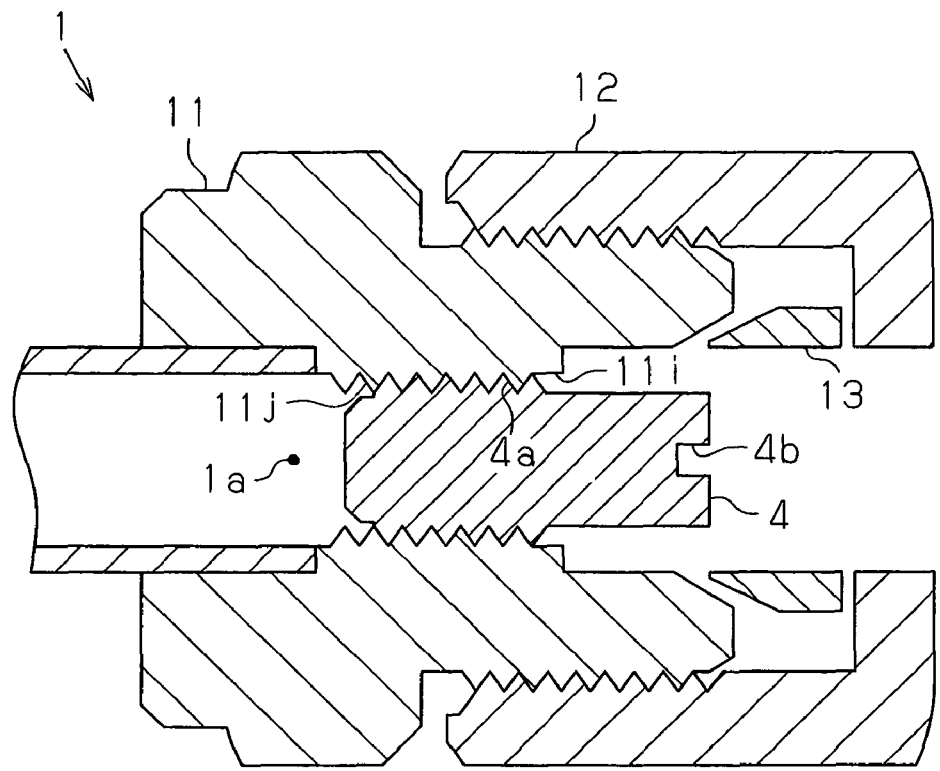
FIG. 9 is a cross-sectional view illustrating a pipe joint cover structure according to another embodiment.

The first to fourth embodiments are constructed so that when the partition cover 2, 3, 22, or 23 is mounted on the pipe joint 1 or 21, the partition cover 2, 3, 22, or 23 is sandwiched between the joint body 11 or 31 and the nut 12 or 32. However, it may also be constructed that a partition cover is screwed into the joint body, thereby sealing the opening 1a or 21a. FIG. 9 is a cross-sectional view illustrating a pipe joint cover structure in which this arrangement is applied to the pipe joint 1. There is formed an internal thread portion 11j on an inner peripheral surface 11i of the joint body 11 that forms the opening 1a of the pipe joint 1. A partition cover 4 is formed in a cylindrical shape and has an outer peripheral surface on which is provided an external thread portion 4a to be screwed into the internal thread portion 11j. The external thread portion 4a is formed to have a thread pitch that gradually changes, and is constructed so that when the external thread portion 4a is screwed into the internal thread portion 11j, their threads engage each other to maintain air tightness. To install the partition cover 4 in the joint body 11, a screwdriver or the like is inserted into a groove portion 4b of the partition cover 4 to screw the partition cover 4 securely. This ensures air tightness between the internal thread portion 11j and the external thread portion 4a and sealing of the opening 1a. Furthermore, since the partition cover 4 does not contact with the sleeve 13, it is possible to prevent the sleeve 13 from being deformed. In addition, the external thread portion 4a of the partition cover 4 may include a well-known removable seal thread arrangement with threads coated with an adhesive material. Furthermore, the aforementioned pipe joint cover structure may be applied to the pipe joint 21.

In the first to fourth embodiments, fluid flowing through a pipe connected to the pipe joint 1 or 21 is not limited to a particular type of fluid. However, the pipe joint 1 or 21 of the first to fourth embodiments may be a pipe joint connected with a pipe through which supercritical coolant used under a supercritical state flows. In such a case, a system in which the pipe joint 1 or 21 is used may undergo a pressure-proof test with no pipes connected thereto, in the case of which high pressure may act upon the partition cover 2, 3, 22, or 23 mounted on the pipe joint 1 or 21. In this regard, the aforementioned pipe joint cover structure is configured so that the opening 1a or 21a of the pipe joint 1 or 21 is reliably sealed. Accordingly, even when high pressure acts during such a pressure-proof test, it is possible to reliably prevent leakage of coolant from between the pipe joint 1 or 21 and the partition cover 2, 3, 22, or 23.

Furthermore, the pipe joint of the first to fourth embodiments may be used as a pipe joint to be connected with a pipe through which carbon dioxide coolant flows. In this case, since the fluid flowing through the pipe is carbon dioxide coolant, the pipe circuit using the pipe joint 1 or 21 is friendly to the global environment. Furthermore, like the aforementioned supercritical coolant, high pressure may act upon the partition cover during a pressure-proof test when the carbon dioxide coolant is used under a supercritical state. However, even in this case, since the aforementioned pipe joint cover structure ensures that the opening 1a or 21a of the pipe joint 1 or 21 is sealed, it is possible to reliably prevent leakage of coolant from between the pipe joint 1 or 21 and the partition cover 2, 3, 22, or 23.

Furthermore, the pipe joint of the first to fourth embodiments may be a pipe joint to be connected with a pipe through which hydrocarbon coolant flows. In this case, since the fluid flowing through the pipe is hydrocarbon coolant such as propane or isobutane, the pipe circuit using the pipe joint 1 or 21 is friendly to the global environment. Furthermore, the aforementioned pipe joint cover structure ensures that the opening 1a or 21a of the pipe joint 1 or 21 is sealed. Accordingly, when the system using the pipe joint 1 or 21 undergoes a pressure-proof test with no pipes connected thereto, it is possible to reliably prevent leakage of highly flammable hydrocarbon coolant from between the pipe joint 1 or 21 and the partition cover 2, 3, 22, or 23.

Figure 10:
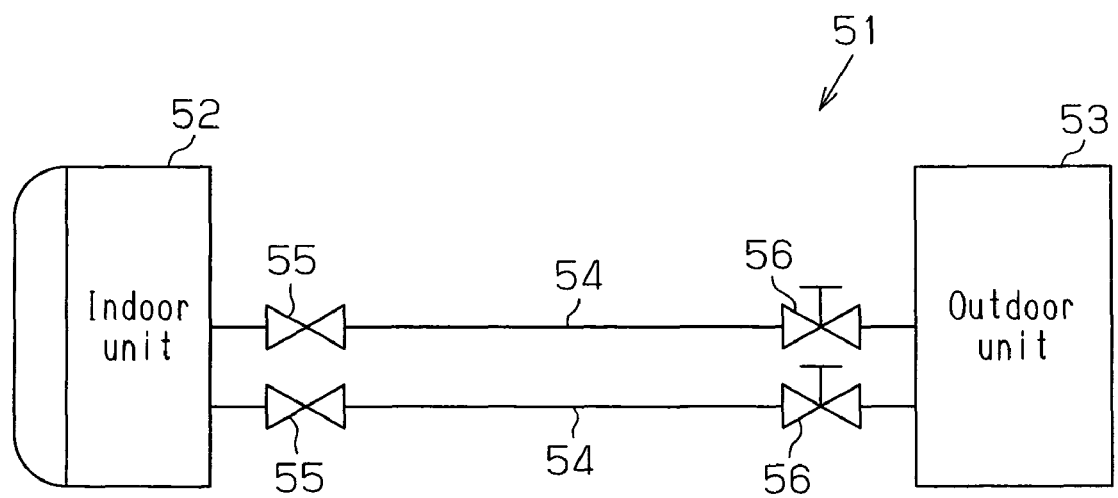
FIG. 10 is a schematic view illustrating coolant pipes connected between an indoor unit and an outdoor unit of an air conditioner.

In the first to fourth embodiments, the pipe joint cover structure is applied to the pipe joint 1 or 21 to which two pipes are connected. However, this pipe joint cover structure may be applied to connections 55 and 56 of a coolant pipe 54 that communicates between an indoor unit 52 and an outdoor unit 53 of an air conditioner 51 as shown in FIG. 10. In this case, when the partition cover 2, 3, 22, or 23 is mounted on the pipe joint 1 or 21 provided at the connections 55 and 56, the opening 1a or 21a of the pipe joint 1 or 21 can be reliably sealed. Accordingly, when the air conditioner 51 undergoes a pressure-proof test with the partition cover 2, 3, 22, or 23 mounted, it is possible to prevent leakage of coolant from between the pipe joint 1 or 21 and the partition cover 2, 3, 22, or 23. Furthermore, dust particles or moisture intrusion is prevented before piping connection, e.g., during transportation of the air conditioner 51. Furthermore, the sleeve 13 or 33 is prevented from being deformed when the partition cover 2, 3, 22, or 23 is mounted on the pipe joint 1 or 21. This allows for ensuring air tightness at the connection of the coolant pipe 54 when the coolant pipe 54 is connected to the pipe joint 1 or 21. In addition, the pipe joint cover structure of the first to fourth embodiments may be applied to a connection of a closing valve provided at the connection 56 or a connection of a coolant pipe for a refrigerator other than the air conditioner 51.

Figure 11:
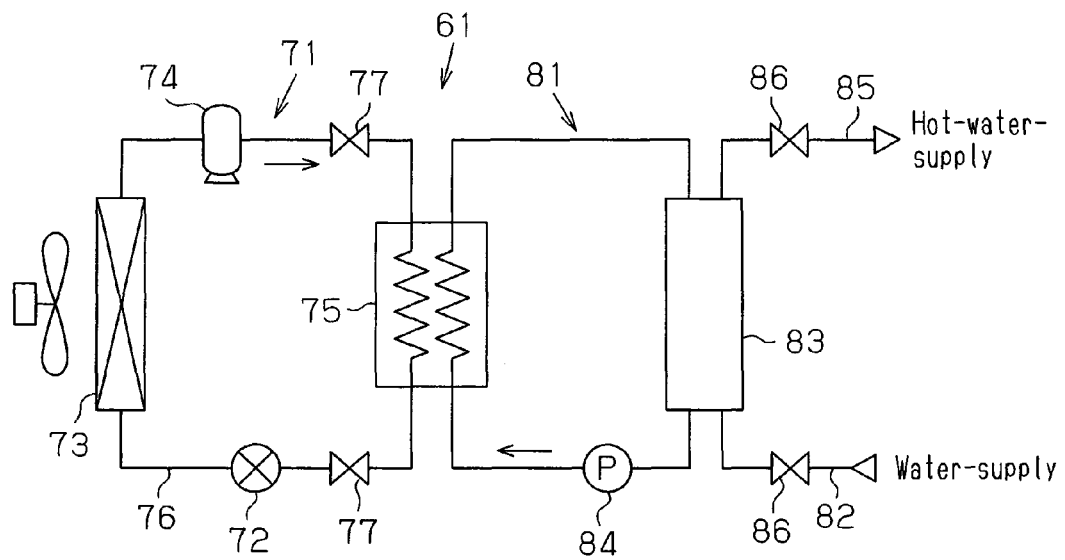
FIG. 11(a) is a schematic view illustrating a heat pump water heater with piping.
FIG. 11(b) is a schematic view illustrating a heat pump water heater of another embodiment with piping.
Figure 12A:
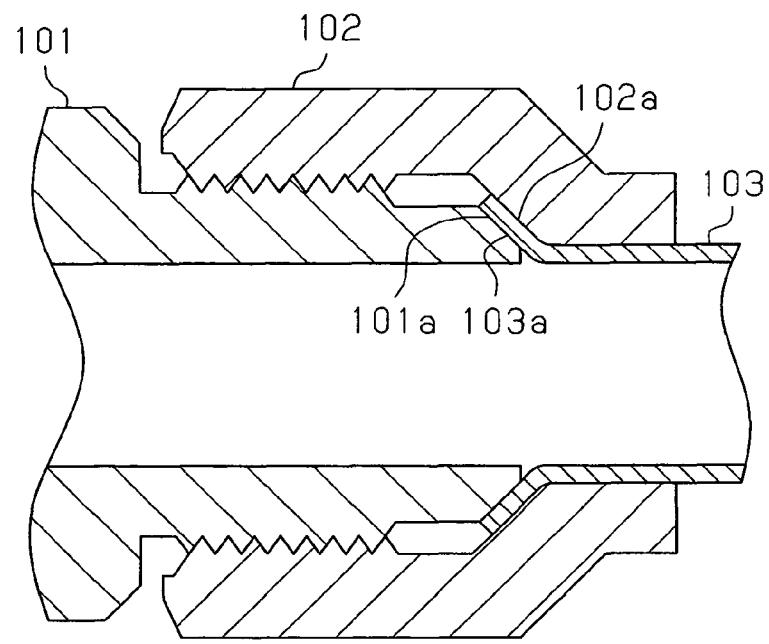
FIG. 12(a) is a cross-sectional view illustrating the construction of a conventional flare joint.
Figure 12B:
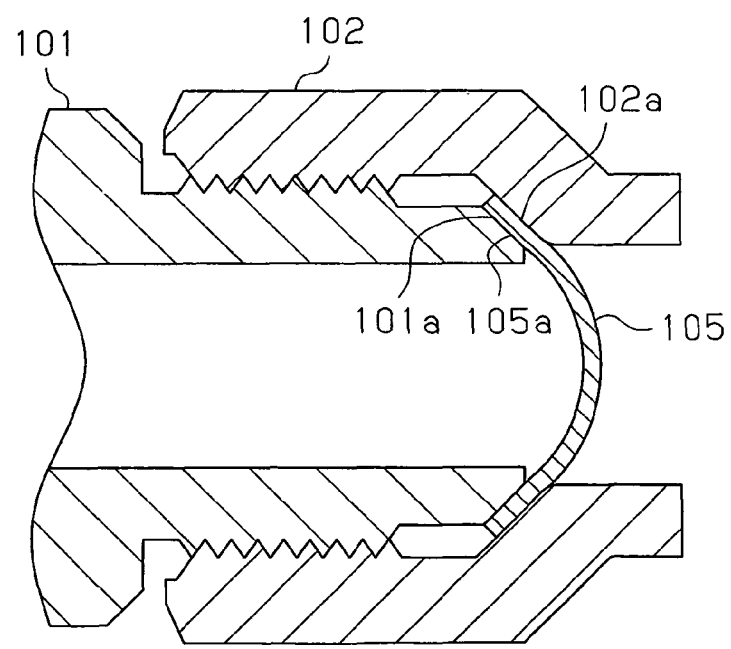
FIG. 12(b) is a cross-sectional view illustrating a conventional flare joint cover structure.
Figure 13A:
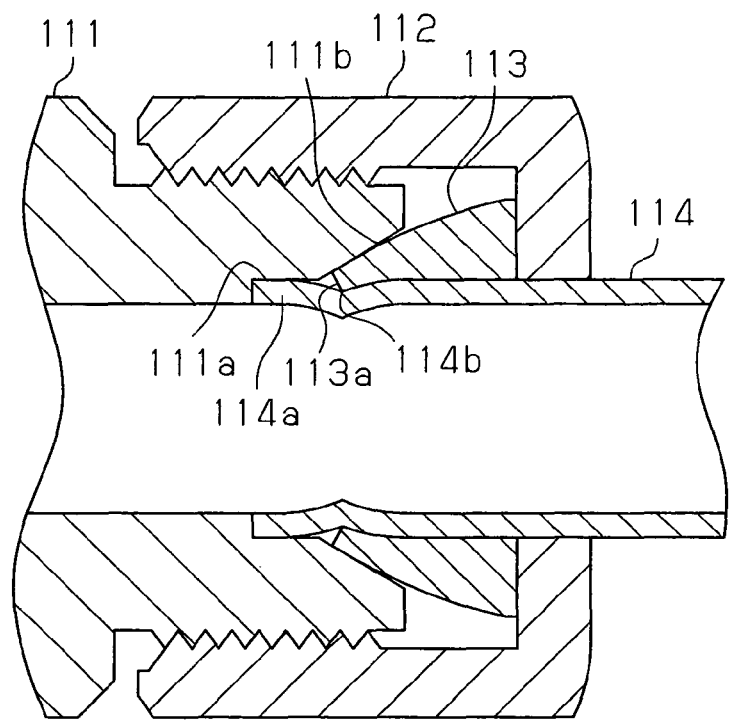
FIG. 13(a) is a cross-sectional view illustrating the construction of a conventional flareless joint.
Figure 13B:
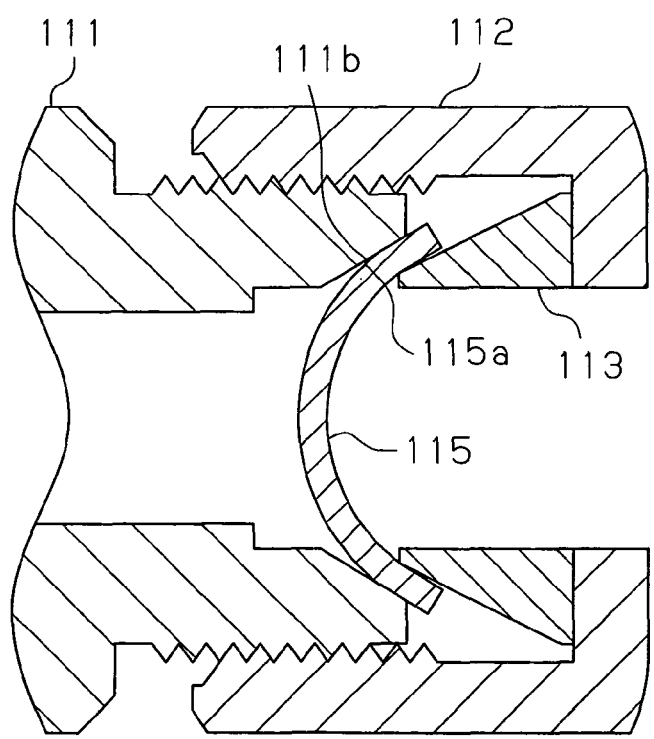
FIG. 13(b) is a cross-sectional view illustrating a conventional flareless joint cover structure.

Furthermore, the pipe joint cover structure of the first to fourth embodiments may be applied to a connection of a pipe for a heat pump water heater. FIG. 11 is a schematic view illustrating a heat pump water heater with pipes connected thereto. FIG. 11(a) is a schematic view illustrating a heat pump water heater 61 including one tank. The heat pump water heater 61 includes a heat pump unit 71 which pumps heat from outside, and a hot-water storage unit 81 which supplies hot water using the heat pumped by the heat pump unit 71. The heat pump unit 71 is constructed of a refrigeration cycle system which has an expansion valve 72, an air heat exchanger 73, a compressor 74, and a water heat exchanger 75. A coolant flows through a coolant pipe 76 which connects between each component. The hot-water storage unit 81 is configured so that water supplied to a tank 83 via a feed water pipe 82 is allowed to circulate by a pump 84 between the tank 83 and the water heat exchanger 75. The hot-water storage unit 81 is also configured such that hot water heat-exchanged through the water heat exchanger 75 is supplied from the tank 83 via a feed water pipe 85. FIG. 11(b) is a schematic view illustrating a heat pump water heater 62 constructed of two tanks. The heat pump water heater 62 is constructed in the same manner as the heat pump water heater 61 except that the tank of a hot-water storage unit 91 has a first tank 92 and a second tank 93 connected in series. Furthermore, hot water stored in the first tank 92 and the second tank 93 is allowed to circulate by a pump 95 to and from a reheating-use heat exchanger 94. There is provided a reheating function by which hot water fed by a pump 98 from a bathtub 96 via a feed water pipe 97 is heated through heat exchange in the reheating-use heat exchanger 94 and then fed back to the bathtub 96 via a feed water pipe 99. In such heat pump water heaters 61 and 62, for example, the pipe joint cover structure of the first to fourth embodiments can be applied to a connection 77 disposed in the coolant pipe 76 or a connection 86 disposed in feed water pipes 82 and 85. Furthermore, in the heat pump water heater 62, the pipe joint cover structure of the first to fourth embodiments can also be applied to a connection 100 additionally disposed in feed water pipes 97 and 99. This allows for ensuring sealing of the opening 1a or 21a of the pipe joint 1 or 21 when the partition cover 2, 3, 22, or 23 is mounted on the pipe joint 1 or 21 provided at the connection 77, 86, or 100. It is thus possible to maintain air tightness during a pressure-proof test or transportation of the heat pump water heaters 61 and 62. Furthermore, the sleeve 13 or 33 is prevented from being deformed when the partition cover 2, 3, 22, or 23 is mounted on the pipe joint 1 or 21. This allows for ensuring air tightness during a pipe connection when a pipe is connected to the pipe joint 1 or 21. In addition, the aforementioned connections 77, 86, and 100 may also be differently located depending on the positions of the components or units that constitute the heat pump water heater. As described above, in addition to coolant pipe connections, the aforementioned pipe joint cover structure can be applied to a feed water pipe connection through which water flows. The aforementioned pipe joint cover structure can also be applied to a connection of feed water pipe formed of resin.

Furthermore, the pipe connection method discussed in the first embodiment may be applied to carry out on-site piping installation of the aforementioned air conditioner 51 or the heat pump water heaters 61 and 62. Use of this method for the on-site piping installation allows the partition cover 2 to be kept mounted on the pipe joint 1 until piping connection, e.g., during transportation, thereby preventing the intrusion of dust particles or moisture. Furthermore, the on-site piping installation can be carried out by the nut 12 being removed and screwed. It is thus possible to provide an on-site piping installation method by which the on-site piping installation can be easily conducted without using special devices or tools.

The technical concepts that are conceived from the aforementioned embodiments are listed below in conjunction with their advantages.

(a) A pipe joint cover structure is configured so that with no pipe connected to a pipe joint, a partition cover constructed to be removable from the pipe joint seals the opening of the pipe joint. The pipe joint includes an internal thread portion on the inner peripheral surface that defines the opening, and the partition cover includes an external thread portion to be screwed into the internal thread portion. The internal thread portion is screwed onto the external thread portion to thereby seal the opening of the pipe joint. The pipe joint cover structure constructed in this manner allows the external thread portion of the partition cover to be screwed into the internal thread portion of the pipe joint, thereby sealing the opening of the pipe joint. It is thus possible to easily mount the partition cover only by forming the internal thread portion on the member that constitutes the opening. Accordingly, a simple structure is used to seal the opening of the pipe joint without affecting the construction of the other members of the pipe joint.

(b) In the pipe joint cover structure according to the aforementioned (a), the pipe joint includes a joint body having an inner periphery on which a joint hole to be connected with a pipe is formed, and having an outer periphery on which a thread portion is formed. The pipe joint cover structure also includes a nut to be screwed onto the thread portion, and a sleeve that bites into the outer periphery of the pipe by the nut being screwed onto the joint body with the pipe having been inserted into the joint hole. The partition cover is mounted on the pipe joint so as not to press the sleeve. This allows the partition cover sealing the opening of the pipe joint or a flareless joint to be mounted on the pipe joint so as not to press the sleeve. It is thus possible to prevent the sleeve from being deformed due to the mounting of the partition cover. It is thus possible to avoid such a situation in which the sleeve cannot be used because of its deformation when the partition cover is removed for connection of a pipe, or air tightness is degraded after piping connection because of the sleeve having been deformed.

The invention claimed is:

1. A pipe joint for connecting a pipe, the pipe joint comprising:
   a joint body through which a joint hole to be connected with a pipe is formed,
   a fastener member to be fastened to the joint body,
   a sleeve that is caused to bite into in an outer periphery of the pipe by the fastener member being fastened to the joint body with the pipe having been inserted into the joint hole, and a partition cover constructed to be removable from the pipe joint, wherein, when the pipe is not connected to the pipe joint, the partition cover seals an opening of the pipe joint, and when the pipe is connected to the pipe joint, the partition cover is removed from the pipe joint, wherein, when the pipe is not connected to the pipe joint, the fastener member fastened to the joint body allows the partition cover to be sandwiched between the joint body and the fastener member, and the partition cover is mounted on the pipe joint to define a space between the partition cover and the fastener member, a length of the space being configured to be greater than a length of the sleeve in an insertion direction of the pipe.

2. The pipe joint according to claim 1, wherein the partition cover is mounted on the pipe joint so as not to press the sleeve.

3. The pipe joint according to claim 1, wherein the partition cover is mounted on the pipe joint so as to elastically press the sleeve.

4. The pipe joint according to claim 1, wherein a thread portion is formed on the joint body, and the fastener member is screwed onto the thread portion to be thereby fastened to the joint body.

5. The pipe joint according to claim 1, wherein the joint body of the pipe joint has a conical guide face formed to guide the sleeve so that the sleeve is deformed to bite into the outer periphery of the pipe upon connection of the pipe, wherein, when mounted on the pipe joint, the partition cover is brought into contact with the guide face to seal the opening of the pipe joint.

6. The pipe joint according to claim 5, wherein, when mounted on the pipe joint, the partition cover is pressed onto the joint body by a surface of the fastener member that is formed substantially perpendicular to the fastening direction.

7. The pipe joint according to claim 1, wherein, when mounted on the pipe joint, the partition cover is brought into contact with an end face of the joint body to which the fastener member is fastened, thereby sealing the opening of the pipe joint.

8. The pipe joint according to claim 1, wherein the pipe joint is constructed such that the sleeve is integrated with the fastener member before the fastener member is fastened to the joint body, and that the fastener member being fastened to the joint body causes the sleeve to be cut off and thus separated from the fastener member.

9. The pipe joint according to claim 8, wherein, when the partition cover is mounted on the pipe joint, the sleeve is not cut off the fastener member.

10. The pipe joint according to claim 1, wherein the partition cover is formed of a resin member.

11. The pipe joint according to claim 1, wherein the pipe joint is connected with a pipe through which a carbon dioxide coolant flows.

12. The pipe joint according to claim 1, wherein the pipe joint is connected with a pipe through which a hydrocarbon coolant flows.

13. A refrigerator wherein the pipe joint according to claim 1 is applied to a coolant pipe connection of the refrigerator.

14. A heat pump water heater wherein the pipe joint according to claim 1 is applied to a coolant pipe connection of the heat pump water heater.

15. A feed water pipe wherein the pipe joint according to claim 1 is applied to a pipe connection of the feed water pipe.

16. A pipe connection method for a pipe joint using the pipe joint cover structure according to claim 1, the method comprising:

a first step of removing the fastener member from the joint body to thereby remove the partition cover;

a second step of inserting a pipe into the joint hole of the joint body; and a third step of allowing the sleeve to bite into the outer periphery of the pipe by the fastener member being fastened to the joint body.

17. An on-site piping connection method, wherein the on-site piping connection is carried out by following the pipe connection method according to claim 16.

* * * * *